J. L. SCHINDLER.
TIRE CHAIN HOOK.
APPLICATION FILED MAY 23, 1921.
1,420,949. Patented June 27, 1922.
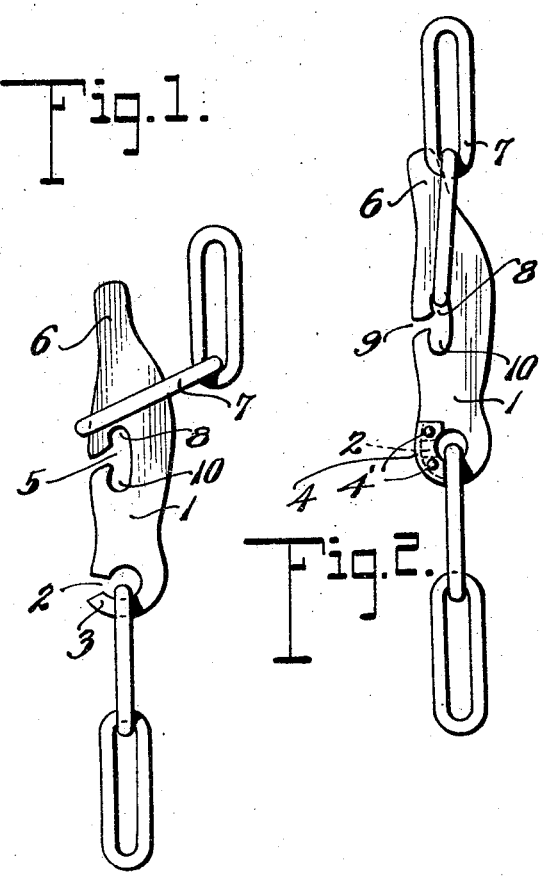
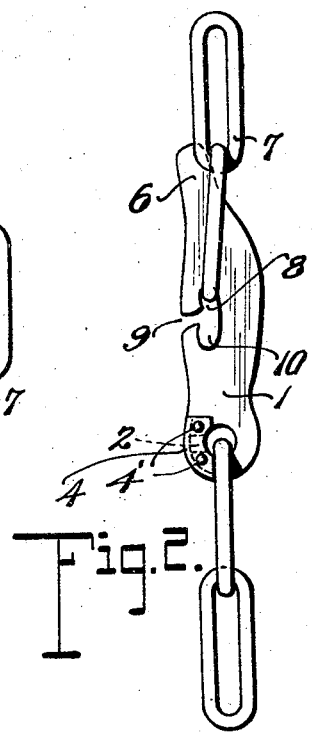
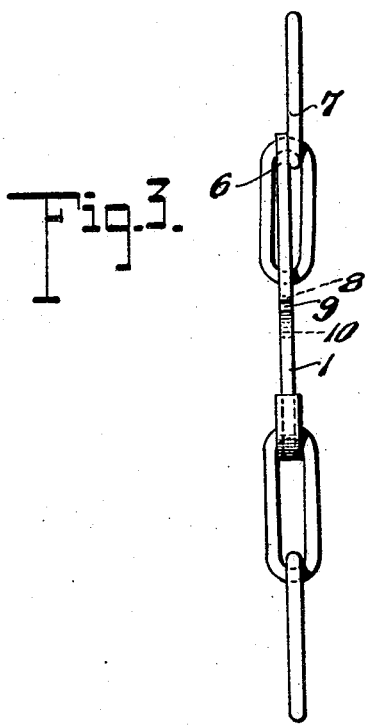
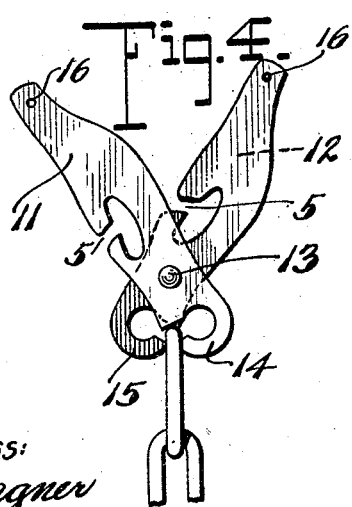
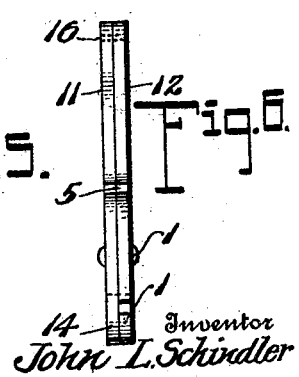
Inventor
John L. Schindler
Witness:
E. W. Wagner
By Robb, Robb & Hill
Attorneys

UNITED STATES PATENT OFFICE.

JOHN L. SCHINDLER, OF MOUNT ANGEL, OREGON.

TIRE-CHAIN HOOK.

1,420,949.  Specification of Letters Patent.  Patented June 27, 1922.

Application filed May 23, 1921. Serial No. 471,667.

*To all whom it may concern:*

Be it known that I, JOHN L. SCHINDLER, a citizen of the United States, residing at Mount Angel, in the county of Marion and State of Oregon, have invented certain new and useful Improvements in Tire-Chain Hooks, of which the following is a specification.

My invention relates to hooks and has for its primary object to provide an improved device especially adapted for connecting the ends of chains, such as non-skid chains for the tires of automobiles, although it will be readily apparent that it could be used on harness in place of the ordinary snap-hook and would even be useful in jewelry.

Another object of the invention is to provide a device of the above character which is readily engageable with the links of a chain but which is so constructed as to make accidental disconnection therefrom practically impossible.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a side elevational view of my invention in its simplest form showing the manner of applying the end of a chain thereto.

Figure 2 is a view similar to Figure 1 showing the ends of the chain in operative relation to the hook portions of the device and a closure member applied to one of the hook portions.

Figure 3 is an edge view of the construction shown in Figure 2.

Figures 4, 5 and 6 are views similar to Figures 1, 2 and 3, showing a modified form of my invention.

Throughout the following detailed description and on the several figures of the drawing, similar parts are referred to by like reference characters.

Referring to the drawings, my invention in its simplest form is shown in Figures 1 to 3, inclusive, in which the reference numeral 1 designates a hook body made in a single piece. The hook body 1 is slotted at one end as indicated by the reference numeral 2 to provide the hook portion 3. The hooked end 3 is adapted to be permanently connected to one end of a chain and for this purpose a closure member 4 for the slot 2 is provided, this closure member being of channel-shape in cross-section to embrace the sides of the body member 1 and is secured to the body member after the link at the end of the chain has been slipped over the hook 3 by means of rivets 4', as shown in Figure 2, one of which passes through the hook 3 and the other through the body portion 1 at the side of the mouth of the slot 2 opposite the hook 3. It is not essential to employ the closure member 4 in order to form a permanent connection between the hook 3 and the end of the chain, as the hook 3 shown in Figure 1 could be hammered in to close the mouth of the slot 2.

The hook body 1 is provided intermediate its ends with a T-slot 5 opening at one edge of the hook body. The hook body tapers gradually from the T-slot 5 to the end 6 opposite the hooked end 3. The length of the tapered end 6 of the body measured from the T-slot is slightly greater than the length of a link to be engaged in the T-slot. In order to engage a link 7 on the end of a chain in the T-slot the link must be slipped over the end 6 in the manner indicated in Figure 1. When the chain is pulled taut, as indicated in Figure 2, the outer end of the link 7 engages the end 6 of the body portion 1 which acts as a stop to limit the swinging of the link in one direction, so that the link can never swing far enough to bring its outer end opposite the same edge of the body 1 at which the T-slot opens. When the chain is pulled taut as in Figure 2 the inner end of the link 7 will be engaged in the upper portion 8 of the T-slot 5 and when the chain slackens the inner end of the link will not pass out through the mouth 9 of the slot but will drop to the lower portion 10 thereof. Thus it will be clear that by providing the T-slot opening at one edge of the body of the hook and providing the extended end 6 to act as a stop to limit the swinging of the hook as explained above, accidental disengagement of the link from the hook is rendered practically impossible and without the use of any sort of closure for the mouth of the T-slot.

Figures 4, 5 and 6 show a modified form of my invention. In this form the hook is not intended to be permanently attached to one end of a chain as in the construction shown in Figures 1 to 3, inclusive. It comprises two members 11 and 12 pivotally connected intermediate their ends at 13. The member 11 is the same as the member 1 shown in Figure 1 and the member 12 differs therefrom only in having its slot at one end opening at the opposite edge of the member from that at which the T-slot opens. In order to engage the hooked ends 14 and 15 with a chain link the members 11 and 12 are swung to the open position shown in Figure 4. When the members 11 and 12 are swung closed, as indicated in Figure 5, it will be noted that the hook 14 closes the mouth of the slot in the end of the member 11. It will also be noted that the T-slots in the members 11 and 12 are in exact registration at this time so that a link on the end of a chain may be engaged in the slots in the same manner as indicated in Figure 1. When the link is engaged in the T-slots in the members 11 and 12 it will prevent these members from swinging open to disengage the link from the hooks 14 and 15. Openings 16 are provided, however, in the ends of the members 11 and 12 opposite the hooked ends 14 and 15, and if desired a rivet may be passed through these openings to permanently secure the members 11 and 12 in the closed position after a link has been engaged with the hooks 14 and 15. This rivet would have then the same function as the closure member 4' shown in Figure 2.

From the above description taken in connection with the drawings it will be apparent that I have provided a very unique hook device which is simple in construction, easy to attach, and practically safe against accidental disengagement from the chain or other device to which it may be attached.

Having thus described my invention, what I claim and desire to secure by Letters Patent is:

1. A hook device comprising an elongated body member provided intermediate its ends with a slot opening at one edge of said member and adapted to receive the end of a chain link passed over one end portion of the member, the main seating portion of said slot extending longitudinally and axially of the body member and having a throat portion leading centrally from one side of the seat portion and diagonally of the longitudinal axis in a rearward direction to the edge, whereby movements of the link in opposite directions while in use will be maintained in the longitudinally extending portion of the slot, thereby preventing accidental displacement through the throat portion, said body member having its forward end elongated into a tapering extension substantially in alingment with the longitudinal portion of the slot to form a stop engaging with the end of the chain link.

2. A hook device comprising a flat elongated body member provided intermediate its ends with a substantially T-slot opening at one edge of said member, said slot being adapted to receive and retain one end of a chain link passed over one end portion of said member, said end portion being constructed to act as a stop for cooperation with the other end of the link for limiting movement of said link in one direction, said member being provided at its opposite end with an integral hook, and means for closing the mouth of said hook and adapted to be held by displaceable fastenings.

3. A hook device comprising a pair of superposed, flat, elongated members pivotally connected intermediate their ends, each of said members being provided intermediate its pivot and one end portion with a slot opening at one edge of said member, said slots being arranged to register when said members are moved to closed position, said registering slots being adapted to receive and retain one end of a chain link passed over said end portions of said members, said end portions being constructed to act as a stop for cooperation with the other end of the link for limiting movement of said link in one direction, the opposite end of one of said members being provided with an integral link-engaging hook and the opposite end of the other member being arranged to close the mouth of said hook when said members are moved to closed position.

4. A hook device comprising a pair of superposed, flat, elongated members pivotally connected intermediate their ends, each of said members being provided intermediate its pivot and one end portion with a T-slot opening at one edge of said member, said slots being arranged to register when said members are moved to closed position, said registering slots being adapted to receive and retain one end of a chain link passed over said end portions of said members, said end portions being constructed to act as a stop for cooperation with the other end of said link for limiting movement of said link in one direction, the opposite end of each of said members being provided with a hook, the mouth of each hook being closed by the other hook when said members are closed.

In testimony whereof I affix my signature.

JOHN L. SCHINDLER.